United States Patent [19]
Wollermann

[11] Patent Number: 5,979,272
[45] Date of Patent: Nov. 9, 1999

[54] DEVICE FOR GATHERING, CUTTING AND STRIPPING INSULATED WIRE

[75] Inventor: Kenneth A. Wollermann, Mukwonago, Wis.

[73] Assignee: Artos Engineering Company, Waukesha, Wis.

[21] Appl. No.: 08/797,914

[22] Filed: Feb. 10, 1997

[51] Int. Cl.[6] .................................................. H02G 1/12
[52] U.S. Cl. ............................ 81/9.51; 29/33 F; 29/825
[58] Field of Search ................................... 29/825, 33 F; 81/9.51

[56] References Cited

U.S. PATENT DOCUMENTS

| | | |
|---|---|---|
| 3,309,948 | 3/1967 | Falken . |
| 3,368,428 | 2/1968 | Gudmestad . |
| 3,612,111 | 10/1971 | Meyer . |
| 3,857,306 | 12/1974 | Gudmestad ............................ 81/9.51 |
| 3,909,900 | 10/1975 | Gudmestad . |
| 3,913,426 | 10/1975 | Blaha ..................................... 81/9.51 |
| 4,009,738 | 3/1977 | Baba . |
| 4,091,695 | 5/1978 | Funcik et al. . |
| 4,584,942 | 4/1986 | Gudmestad . |
| 4,713,880 | 12/1987 | Dusel et al. ........................... 29/564.4 |
| 4,856,187 | 8/1989 | Blaha ..................................... 29/867 |
| 4,873,901 | 10/1989 | Stoehr ................................... 81/9.51 |
| 4,932,110 | 6/1990 | Tanaka . |
| 5,016,347 | 5/1991 | Okazaki et al. ....................... 29/825 |
| 5,146,673 | 9/1992 | Hoffa ..................................... 29/828 |
| 5,199,328 | 4/1993 | Hoffa ..................................... 81/9.51 |
| 5,235,555 | 8/1993 | Hoffa ..................................... 81/526 |
| 5,265,502 | 11/1993 | Hoffa ..................................... 81/9.51 |
| 5,285,569 | 2/1994 | Hoffa ..................................... 29/825 |
| 5,293,683 | 3/1994 | Hoffa ..................................... 29/825 |
| 5,297,457 | 3/1994 | Hoffa ..................................... 81/9.51 |
| 5,375,485 | 12/1994 | Hoffa ..................................... 81/9.51 |
| 5,398,573 | 3/1995 | Wollermann ............................ 81/9.51 |
| 5,402,693 | 4/1995 | Hoffa ..................................... 81/9.51 |
| 5,412,856 | 5/1995 | Nazerian et al. . |
| 5,445,051 | 8/1995 | Carpenter et al. . |
| 5,456,148 | 10/1995 | Hoffa ..................................... 83/155 |
| 5,469,763 | 11/1995 | Hoffa ..................................... 29/825 |
| 5,515,602 | 5/1996 | Hoffa ..................................... 29/825 |
| 5,522,130 | 6/1996 | Wollermann ............................ 29/825 |
| 5,528,962 | 6/1996 | Hoffa ................................... 29/825 X |
| 5,539,967 | 7/1996 | Nazerian et al. .................... 29/825 X |
| 5,630,341 | 5/1997 | Hoffa ................................... 29/825 X |
| 5,653,016 | 8/1997 | Hoffa ..................................... 29/825 |

FOREIGN PATENT DOCUMENTS 1216815   3/1986   Russian Federation .

*Primary Examiner*—Carl J. Arbes
*Attorney, Agent, or Firm*—Andrus, Sceales, Starke & Sawall

[57] ABSTRACT

A device is provided for gathering, cutting and stripping insulated wire. The device includes first and second cutterhead assemblies. Each cutterhead assembly includes a central cutting knife and a pair of stripping blades spaced laterally on either side of the cutting knife. A drive system moves the cutting knives in a direction toward each other to cause the cutting knives to cut the wire to a predetermined length and moves the stripping blades in a direction toward each other to cause the stripping blades to sever the insulation on the wires. A positioning head assembly located upstream of the cutterhead assemblies positions the insulated wire between the cutting knives on each cutterhead assembly for cutting and stripping. Wire gathering elements gather the wire positioned between the cutterhead assemblies such that the wire may be found by another handling device downstream of the cutterhead assemblies. The wire gathering device also acts to wipe away the stripped insulation from the stripping blades after stripping of the wire.

8 Claims, 6 Drawing Sheets

DEVICE FOR GATHERING, CUTTING AND STRIPPING INSULATED WIRE

BACKGROUND OF THE INVENTION

This invention relates to devices for cutting and stripping insulated wire, and in particular, to an improved cutterhead assembly for use with the same.

Typically, electrical harnesses are produced by cutting insulated wire to a desired length, stripping the insulation from the cut ends, and then applying terminals to one or both ends of the cut length. The wire is usually contained on a supply coil and fed in a desired increment of length to a cutting and stripping station by cooperating feed rolls or belts.

A conventional cutting and stripping station includes a pair of opposed cutterhead assemblies, each including a central cutting knife and a pair of stripping knives which are located in spaced relation on either side of the cutting knife. After a predetermined length of wire has been positioned between the upper and lower cutterhead assemblies, the knives on the upper and the lower cutterhead assemblies are moved toward each other causing the cutting knives or blades to sever the wire and causing the stripping knives to cut the insulation.

Wire gripping units, located upstream and downstream of the cutting and stripping station, grip the wire, and the cut length. The gripping units move the wire and the cut length in opposite directions so as to strip the insulation from the ends of the wire and from the cut length. As a result, guiding the axial movement of the wire through the cutting and stripping station and gathering the wire such that it may be located by the wire gripping unit downstream of the blades is of utmost importance.

Prior attempts to control the gathering and guiding of the wire through the cutting and stripping station have significant disadvantages. For example, in Gudnestad, U.S. Pat. No. 3,909,900, a reciprocating wire guide tube is disclosed. As the wire is axially moved through the cutting and stripping station, a guide tube is extended through therewith, and retracted in order to allow the closure of the blades. This system offers several disadvantages in that the extension and retraction of the wire guide tube increases the time required to process the wire. Further, the wire guide tube is sized for either the maximum cross section of the wire to be processed, in which case it is not at an optimum size for the smaller cross sectional wire, or the guide tube has to be changed which is costly and takes away from the process time. In addition, the wire guide tube does not allow for an enlargement on the lead end of the wire, such as a terminal or the like to pass therethrough.

In the alternative, wire guides such as those shown in Hoffa, U.S. Pat. No. 5,253,555 have been used. However, these types of wire guides have similar types of disadvantages. For example, the opening and closing of the guide members increases the cycle time for processing the wire. Further, the wire guide must be sized for the largest cross section of wire to be processed. As such, the use of different sized wire guides requires the additional costs associated with the manufacture of the wire guides and the downtime associated with changing of the wire guides for different sized wires. In addition, as with the wire guide tube disclosed in the '900 patent, the wire guide disclosed in the '555 patent does not allow terminals on the end of the wire to pass therethrough.

Blaha, U.S. Pat. No. 4,856,187 discloses an attempt to provide a wire gathering mechanism for gathering electrical wire or the like in a cutting and stripping station in order that the wire may be found by another handling device downstream of the knives. The wire gathering mechanism disclosed in the '187 patent has several disadvantages including the cost of the parts, and the difficulty in actuating the mechanism. Further, the wire gather mechanism disclosed in the '187 patent may add to the wire overhang which, in turn, reduces control of the wire during further processing.

Therefore, it is a primary object and feature of the present invention to provide a device for cutting and stripping insulated wire which allows for the gathering of wire of different gauges.

It is a further object and feature of the present invention to provide a device for cutting and stripping insulated wire having a gathering device which accommodates wire having terminals or the like mounted to the lead end thereof.

It is a further object and feature of the present invention to provide a device for cutting and stripping wire which may be programmed to adjust to cut and strip wire of various gauge sizes.

It is a still further object and feature of the present invention to provide a device for cutting and stripping insulated wire which simply and easily wipes the insulation slugs off the stripping blades after the stripping operation.

In accordance with the present invention, a device for gathering, cutting and stripping insulated wire is provided. The device includes first and second cutterhead assemblies. Each cutterhead assembly includes a central cutting knife and a pair of stripping blades spaced laterally on either side of the cutting knife. Upstream and downstream positioning head assemblies are also provided. The upstream positioning head assembly positions the insulated wire between the cutting knives of each cutterhead assembly for cutting and stripping.

A wire gathering element is mounted to each cutterhead assembly. Each wire gathering element has a planar portion for gathering the wire position therebetween by the upstream positioning head assembly.

In operation, after the insulated wire has been positioned between the cutterhead assemblies, the wire gathering elements, the cutting knives and the stripping blades are moved toward each other simultaneously such that the planar portions of the wire gathering elements gather the wire to align the wire with a gripping unit downstream of the cutting head assemblies.

At a predetermined position, the wire is gripped by the downstream gripping unit and an additional, gripping unit upstream of the cutterhead assemblies. Thereafter, with the gathering elements remaining in a fixed position, the cutting knives and the stripping blades are brought together to cause the cutting knives to sever the wire, and to cause the stripper knives to cut the insulation.

After the insulation is cut, the gripping units are separated away from each other so as to strip the slugs of insulation away from the ends of the wire. The cutting knives and the stripping blades are then retracted so as to pass through slits in the wire gathering elements. The wire gathering elements, in turn, wipe off any slugs of insulation which may have stuck to the stripping blades. The cutting knives, stripping blades, and wire gathering elements return to their original, home position in order to await the positioning of another portion of insulated wire between each cutterhead assembly.

The movement of the cutting knives, the stripping blades and the wire gathering elements are controlled by a central processing unit. The central processing unit actuates a servo motor which, in turn, controls movement of the elements.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENT

Figure 1:
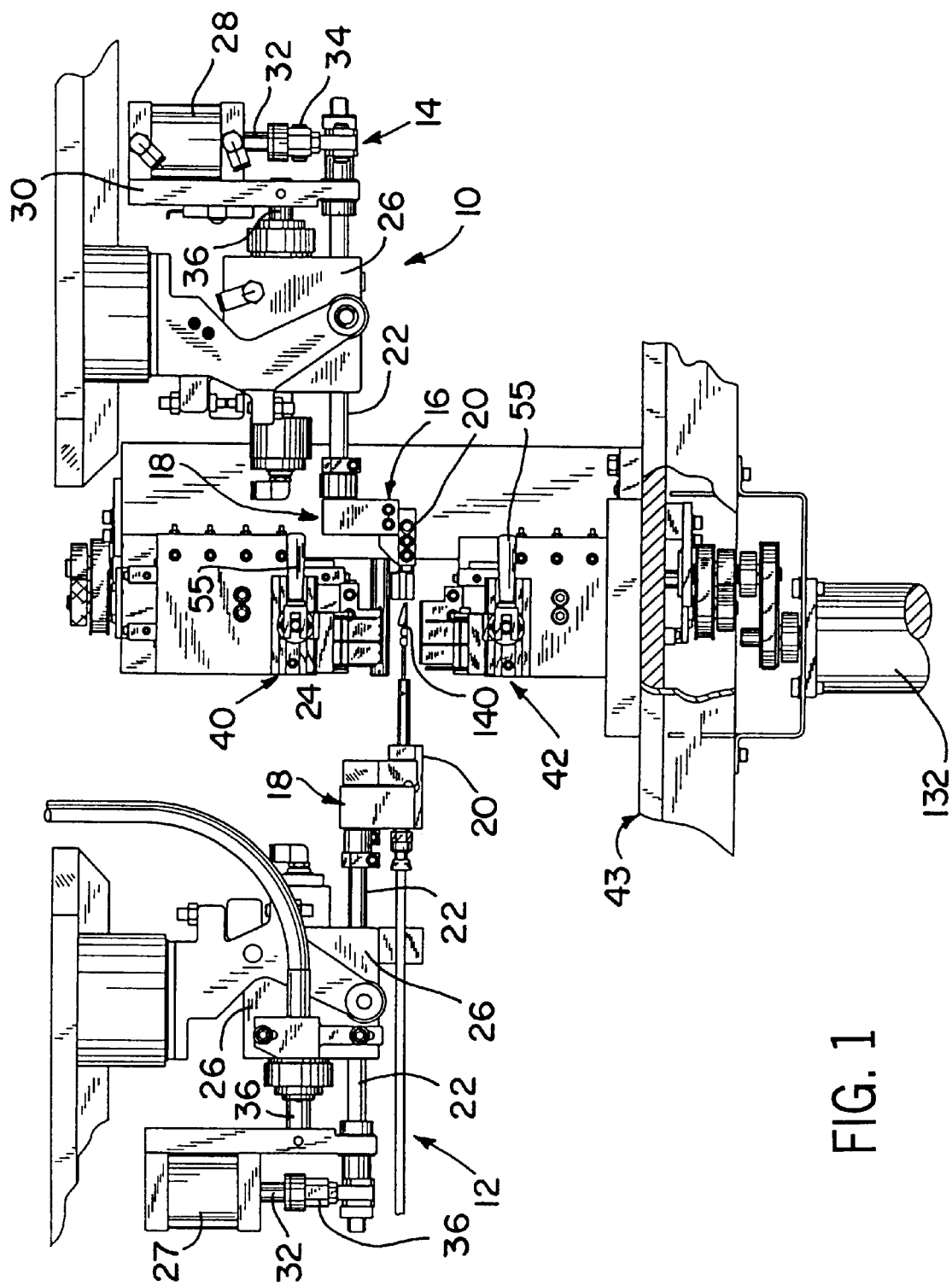
FIG. 1 is a front elevational view, partially in section, showing a cutting and stripping station incorporating the cutterhead assemblies of the present invention.

Referring to FIG. 1, a cutting and stripping device incorporating the cutterhead assemblies of the present invention is generally designated by the reference numeral 10. The cutting and stripping device 10 includes a first upstream positioning head assembly 12 and a second, downstream positioning head assembly 14. Positioning head assemblies 12 and 14 are identical and hence the second, downstream positioning head assembly 14 will be described in detail with the description thereof being understood also to describe the first, upstream positioning head assembly 12.

Positioning head assembly 14 includes a gripping unit 16. Gripping unit 16 includes a clamping head 18 having a pair of jaws 20 mounted for pivoting movement on parallel slider rods 22. Jaws 20 are adapted to be moved between an opened position and a closed position wherein the jaws 20, when engaged, clamp an insulated wire 24. Rods 22 are mounted for sliding movement within tubular guides formed in the lower portion of gripper body 26.

To rotate rods 22 and thus move jaws 20 between the opened and closed position, a cylinder 28 is mounted to a bracket 30. A piston rod or ram 32 extends downwardly from cylinder 28 and is connected through linkage 34 to the ends of slider rods 22. Movement of piston rod 32 acting through linkage 34 will rotate rods 22, thereby pivoting the clamping jaws 20 between the opened and the closed positions. Construction of clamping jaws 20 and the mechanism for moving the jaws between the open and closed position is similar to that described in U.S. Pat. No. 4,713,880 and U.S. Pat. No. 5,398,573, and as such, the subject matter disclosed in those patents are incorporated herein by reference.

Slider rods 22 are also adapted to be moved in a longitudinal direction parallel to the axis of wire 24 by a second cylinder unit defined by gripper body 26. A piston rod 36 is driven by the cylinder within gripper body 26 and is interconnected to bracket 30. Thus, movement of piston rod 36 by the cylinder within gripper body 26 will be transmitted through bracket 30 to move slider rods 22 in a longitudinal direction for stripping purposes, hereinafter described. Cutting and stripping device 10 further includes a first upper cutterhead assembly 40 and a second lower cutterhead assembly 42 supported by a support structure 43. Upper and lower head assemblies are identical, and hence the upper cutterhead assembly 40 will be described in detail with the description thereof being understood to describe the second, lower cutterhead assembly 42.

Figure 2:
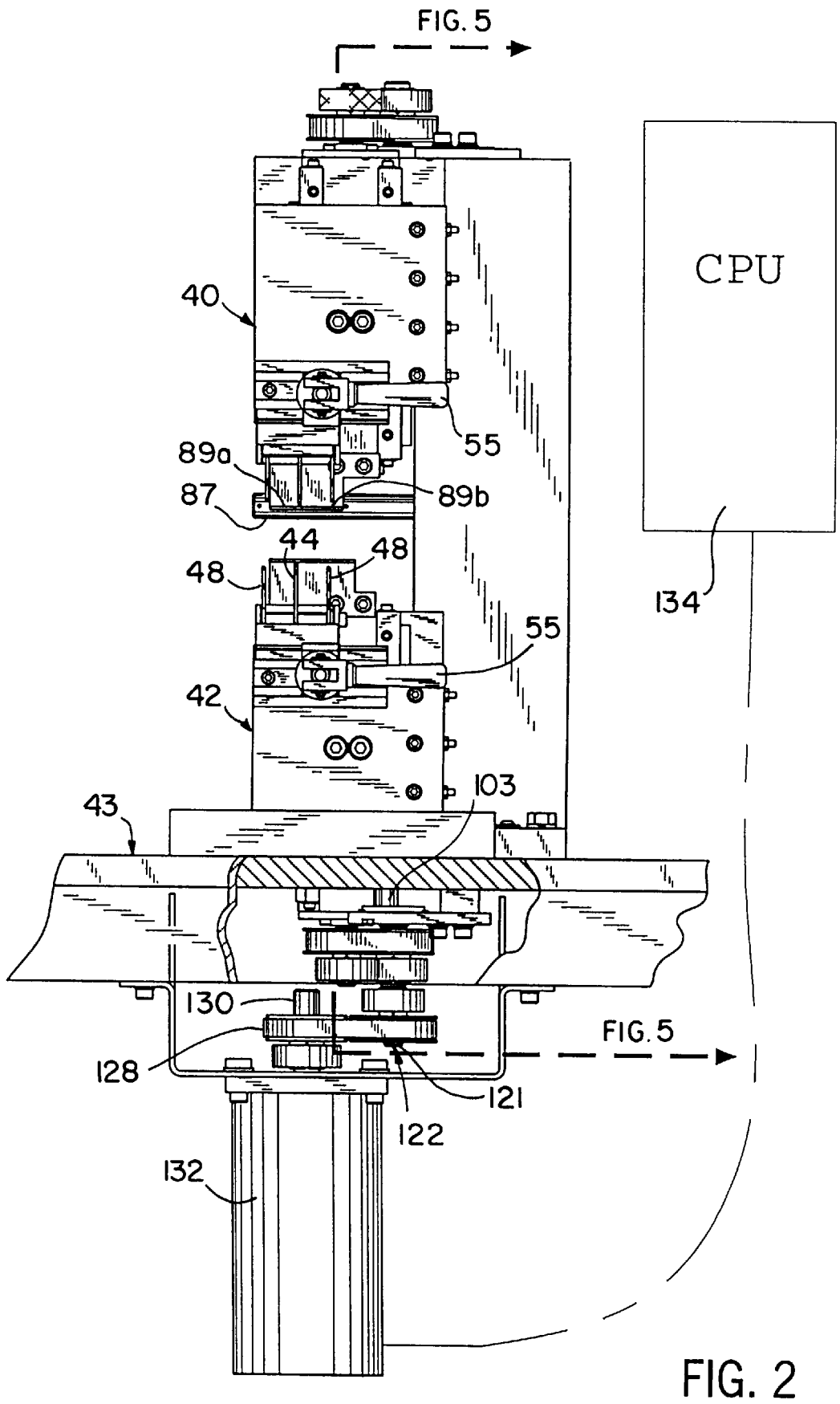
FIG. 2 is an enlarged view showing a portion of the cutting and stripping station of FIG. 1.
Figure 3:
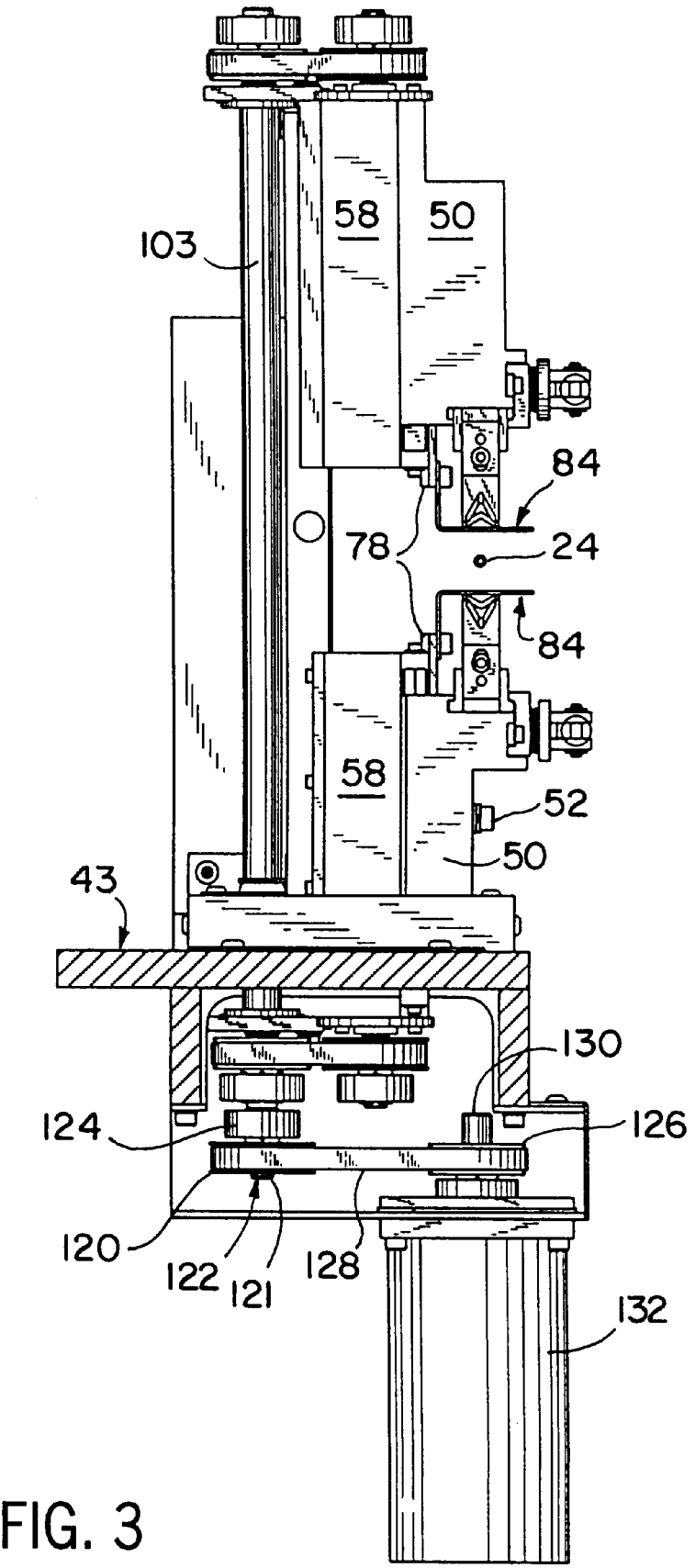
FIG. 3 is a side elevational view showing the upper and lower cutterhead assemblies of the present invention.
Figure 5:
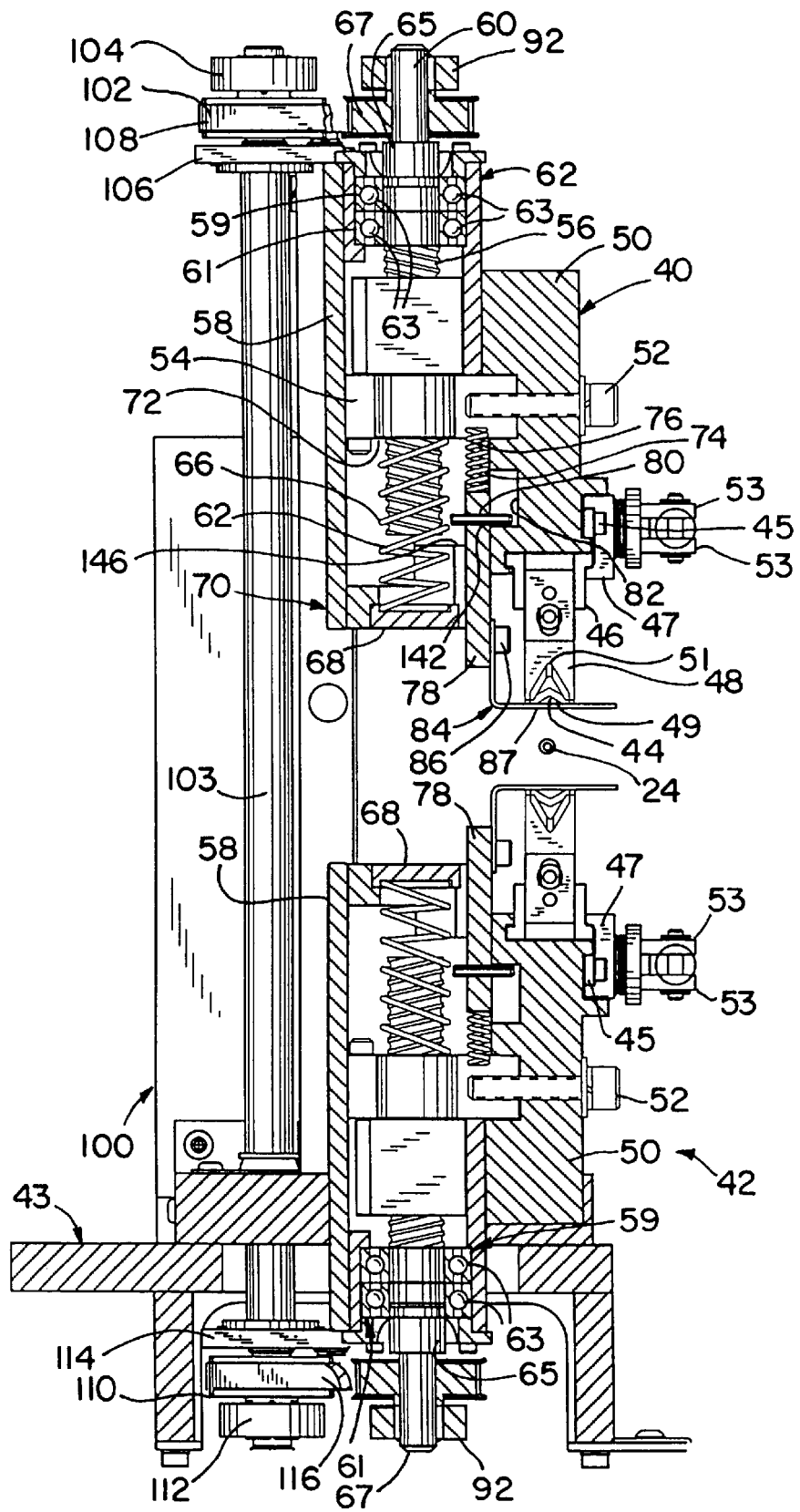
FIG. 5 is a cross sectional view of the upper and lower cutterhead assemblies of FIG. 2 taken along line 5—5.

Referring to FIGS. 2 and 5, upper cutterhead assembly 40 includes a cutting blade or knife 44 which is mounted in a knife block 46 between a pair of stripping blades or knives 48. To secure the knife block 46 which carries cutting knife 44 and stripping blades 48 to a knife block slide 50, a draw bolt 45 is fixed to knife block slide 50, as well as clamping bar 47. Cams 53 are mounted for pivotal movement of the end of draw bolt 45. Handle 55 is connected to cams 53 such that through movement of handle 55, the cams 53 will exert a clamping force on clamping bar 45 thereby securing knife block 46 to the knife block slide 50.

Stripping blades 48 may be of the type disclosed in Wollermann U.S. Pat. No. 5,414,931 and, therefore, the construction of that patent is incorporated herein by reference.

The outer cutting edge 49 of cutting knife 44 has a V-shape, and the outer edges of stripping blades 48 are similarly provided with a generally V-shaped configuration. The depth of the V is greater in the stripping blades 48 then the depth of the V in the cutting knife 44 so as to facilitate the cutting and the stripping of wire 24, as is known. As best seen in FIG. 2, cutting knife 44 and stripping blades 48 are spaced apart within knife block 46. As previously described, knife block 46 is supported in a knife block slide 50, which, in turn, is mounted by screw 52 to ball nut 54. As best seen in FIG. 5, ball nut 54 is threaded onto a ball screw 56 which is supported within a housing 58. The disclosed drawings depict the use of a ball screw 56, however it is contemplated as being within the scope of the present invention to substitute ball screw 56 with any type of linear positioning actuator without deviating from the scope of the present invention.

Ball screw 56 extends within housing 58 and is rotatably supported therein by first and second bearings 59 and 61. Each bearing 59 and 61 includes a plurality of balls 63 therein to facilitate rotation of ball screw 56. A first end 60 of ball screw 56 projects from a first end 62 of housing 58 and includes a shoulder 65 formed thereabout for supporting a pulley 67. A spring 64 is positioned about the second, opposite end 66 of ball screw 56 between an end cap 68 mounted in the end 70 of housing 58 and a corresponding surface 72 of ball nut 54 in order to preload ball nut 56 in a given direction.

A second spring 74 has a first end positioned within a pocket 76 in ball nut 54 and a second end which engages gathering slide 78 so as to bias gathering slide 78 away from ball nut 54. A dowel pin 80 extends through gathering slide 78 and has a first end which rides in a guide slot 82 in knife block slide 50 and a second end which rides in a guide slot in housing 58.

A generally L-shaped wire guide 84 is mounted by screws 86 to gathering slide 78. As best seen in FIG. 4B, each cutterhead assembly 40 and 42 includes guide rails 79 which guide the movement of knife block slide 50 and gathering slide 78. Wire guide 84 includes a generally flat, horizontal portion 87 having a slit 89a therein so as to allow the outer edge 49 of cutting knife 44 to pass therethrough. Horizontal portion 87 of wire guide 84 also includes a second slit 89b which allows outer edge 51 of stripping blade 48 to pass therethrough.

Pulley 67 is journalled between shoulder 65 in ball screw 56 and a collar 92. Pulley 67 of each upper and lower cutterhead assemblies 40 and 42 are rotated simultaneously by a drive unit 100 as hereinafter described. By connecting pulleys 67 of upper and lower cutterhead assemblies 40 and 42 to a single drive unit, ball screws 56 of each cutterhead assembly 40 and 42 are rotated simultaneously so as to accurately control movement of wire guides 84, cutting knives 44, and stripping blades 48, as hereinafter described.

Drive assembly 100 includes a drive shaft 103 having an upper pulley 102 journalled between a collar 104 and ring member 106. Pulley 102 drives pulley 67 of upper cutterhead assembly 40 by means of a timing belt 108. A second lower pulley 110 is journalled between a collar 112 and a ring 114 on drive shaft 103. A timing belt 116 interconnects pulley 110 to pulley 67 on lower cutter assembly 42.

Drive shaft 103 also includes a second lower pulley 120 journalled between a ring 121 on end 122 of drive shaft 103 and collar 124. Pulley 120 is interconnected by a timing belt 128 to a servo motor pulley 126, which in turn, is mounted on drive shaft 130 of servo motor 132. As described, rotation of drive shaft 132 causes rotation of drive shift 103 which, in turn, simultaneously rotates ball screw 56 of each cutterhead assembly 40 and 42. Referring to FIG. 2, servo motor 132 is responsive to commands of a central processing unit 134 in a manner hereinafter described.

Figure 4A:
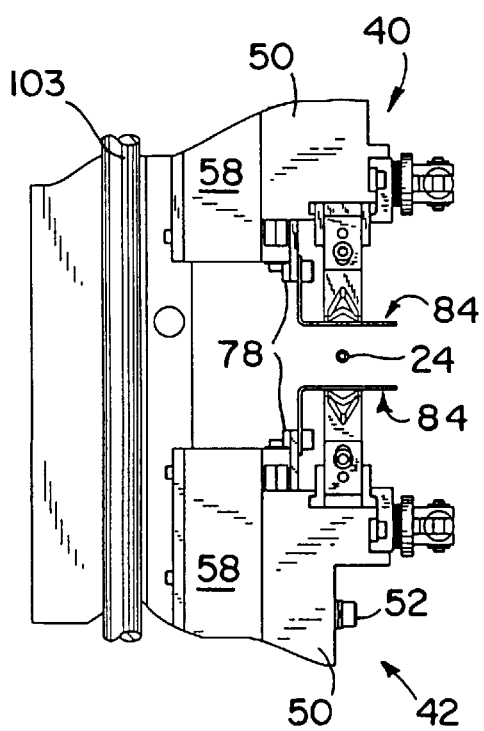
FIG. 4A is an enlarged view of FIG. 3 showing a portion of the upper and lower cutterhead assemblies of the present invention wherein the blades and the wire guide are in a first cutter home position.
Figure 4B:
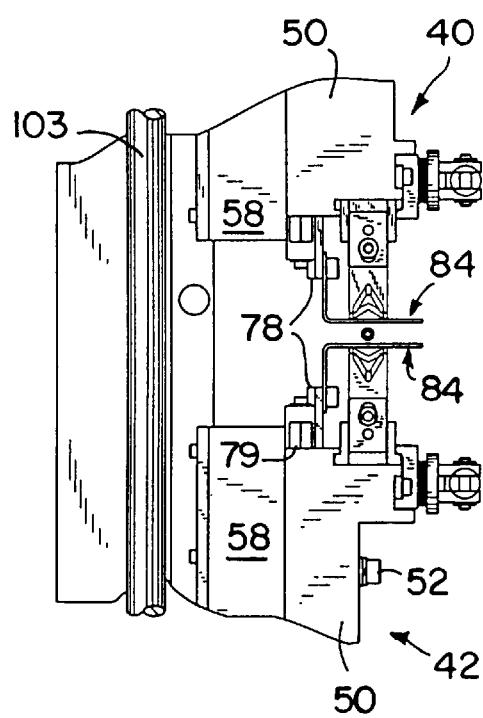
FIG. 4B is an enlarged view of FIG. 3 showing upper and lower cutterhead assemblies of the present invention wherein the blades and the wire guide are in a second cutter ready position.

Referring to FIG. 4A, the cutting knives 44 and the stripping blades 48 of the upper and lower cutterhead assemblies 40 and 42 are shown in the first "cutter home" position. In operation, positioning head assembly 12 positions the lead end 140 of wire 24 between upper and lower cutterhead assemblies 40 and 42, respectively, as shown in FIG. 1, while wire guides 84 allow the lead end 140 of wire 24 to pass beyond knife block 46.

In response to commands from central processing unit 134, servo motor 132 rotates drive shaft 130 in a first direction which in turn rotates drive shaft 103 of drive system 100. Drive shaft 103, in turn, simultaneously drive ball screws 56 of each cutterhead assembly 40 and 42 by means of timing belts 108 and 116, respectively. Since ball screws 56 have opposite threads, the rotating ball screws 56 of each cutterhead assembly 40 and 42 causes each ball nut 54 to travel on their respective ball screws 56 in a direction toward each other.

As ball nuts 54 move axially toward each other, knife blocks 50 of each cutterhead assembly 40 and 42 also move axially toward each other. Consequently, the cutting knife 44 and the stripping blades 48 of each cutterhead assembly 40 and 42 move toward each other.

Similarly, as each ball joint 54 moves axially on its corresponding ball screw 56, spring 74 continues to bias gathering slide 78 away from ball nut 54 such that dowel pin 80 rides in guide slot 82 of knife block slide 50 and such that each wire guide 84 moves simultaneously with its corresponding cutting knife 44 and stripping blades 48. Consequently, movement of gathering slides 78 of each cutter assembly 40 and 42 toward each other causes the horizontal portions 87 of each wire guide 84 to move toward each other thereby gathering wire 24 with jaws 20 of gripping unit 16 of downstream positioning head assembly 14.

The central processing unit 134 continues actuating servo motor 132 until such point as knife block slide 50 and gathering slides 78 are in the "cutter ready" position, FIG. 4B. In the cutter ready position, the first end of dowel pin 80 engages a shoulder 146 formed in housing 58 so as to prevent further movement of the gathering slide 78 of each cutterhead assembly 40 and 42 toward each other. It is contemplated that central processing unit 134 may adjust the cutter ready position to accommodate various types of wire. In addition, as the spacing between the horizontal portions 87 of wire guides 84 is reduced, lead end 140 of wire 24 becomes axially aligned with jaws 20 of gripper unit 16. Thereafter, wire 24 is fed axially between cutterhead assemblies 40 and 42. Clamping jaws 20 of each gripping unit 16 are moved to the closed position by operation of cylinders 28 in order to grip the wire.

Central processing unit 134 then actuates servo motor 132 thereby causing, as previously described, ball nuts 54 to once again move toward each other. However, as previously described, the first end of dowel pin 80 of each gathering slide 78 engages shoulder 146 in its corresponding housing 58 thereby preventing further axial movement of each gathering slide 78 toward each other.

Figure 4C:
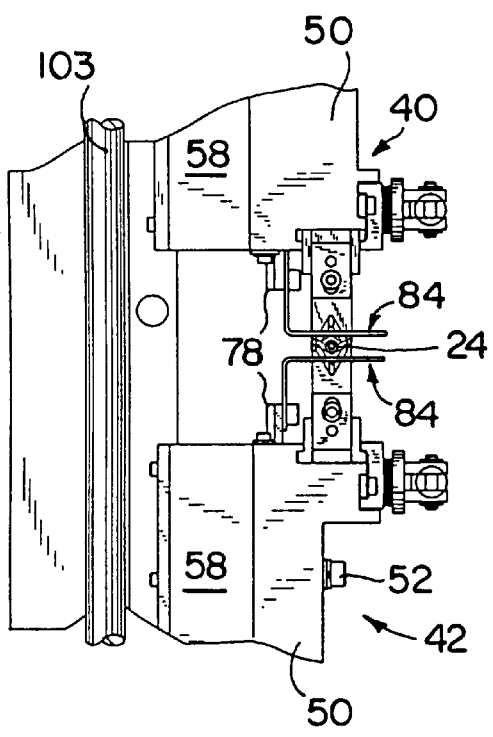
FIG. 4C is an enlarged view of FIG. 3 showing the upper and lower cutterhead assemblies of the present invention wherein the blades are in the third cutoff position.

As ball nuts 54 continue toward each other, knife blocks 50 also continue toward each other thereby bringing cutting knives 44 of each cutterhead assembly 40 and 42 through corresponding slits 89a in wire guide 84 and toward the wire to cause the cutting knives 44 to sever the wire, as shown in FIG. 4C.

Figure 4D:
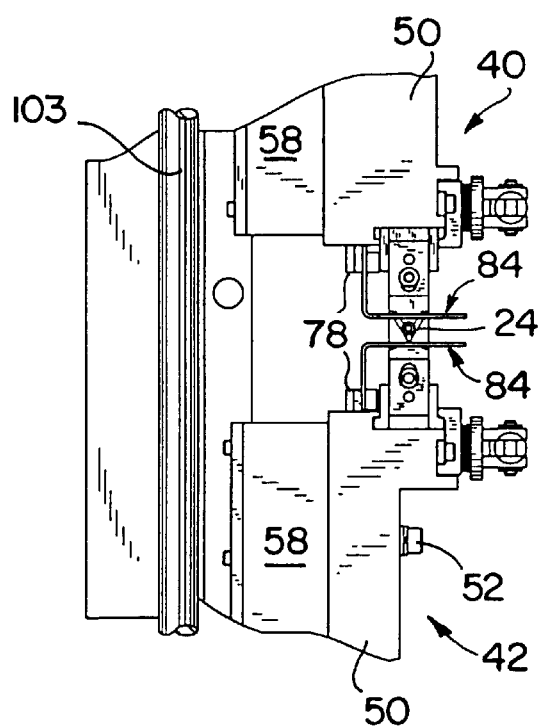
FIG. 4D is an enlarged view of FIG. 3 showing the cutterhead assemblies of the present invention wherein the blades are in a fourth strip diameter position.

After wire 24 has been cut, central processing unit 134 actuates servo motor 32 to further drive knife blocks 50 of each cutterhead assembly 40 and 42 further toward each other such that stripping blades 48 are moved together to cut the insulation on the wire 24 and on the cut length of held in the gripping unit 16 of downstream positioning head assembly 14, FIG. 4D.

With the insulation cut, the cylinder housed in gripper body 26 is actuated thereby urging brackets 30 in positioning head assemblies 12 and 14 away from each other which, consequently, moves clamping jaws 20 away from each other. This movement of clamping jaws 20 away from each other will strip the slugs of insulation from the ends of the wire. As described in the Wollermann, U.S. Pat. No. 5,398,573, incorporated herein by reference, changes in strip length and wire gauge can be accomplished by either simple manual or fully automatic adjustment. The adjustments are infinite as opposed to steps or increments, thereby providing greater accuracy in establishing a strip length and wire gauge size.

After the slugs have been removed from the ends of the wire, central processing unit 134 actuates servo motor 132 to rotate servo motor shaft 130 in a second opposite direction. By rotating shaft 130 in a second opposite direction, pulleys 128 and 132 rotate in opposite directions thereby rotating drive shaft 103 similarly. With drive shaft 103 rotating in an opposite direction, the drive shaft 103 rotates ball screws 56 in opposite directions thereby causing ball nuts 54 of cutterhead assemblies 40 and 42 to move away from each other.

As ball nuts 54 move away from each other, knife blocks 50 mounted thereto also move away from each other thereby causing cutting knives 44 and stripping blades 48 to return to the position shown in FIG. 4B. As the cutting edge 51 of each cutting blade 48 passes the horizontal portion 87 of wire guide 84, any slugs stuck to cutting blades 48 are wiped off. Controlled by the central processing unit 134, servo motor 132 and hence drive system 100 returns knife block slide 50 and gathering slide 78 to the original "cutter home" position.

It is contemplated as being within the scope of the present invention that the central processing unit may vary the cutter home position in order to accommodate wires of different gauges. Further, the other positions may be varied accordingly by the central processing unit in order to accommodate a wide variety of wire. The adjustments are infinite, thereby providing greater accuracy in the gathering, cutting and stripping of insulation.

Various modes of carrying out the invention are contemplated as being within the scope of the following claims particularly pointing out and distinctly claiming the subject matter which is regarded as the invention.

I claim:

1. In a wire cutting and stripping apparatus, a supporting structure, a pair of cutting heads mounted for movement on the supporting structure in a direction toward and away from each other from an open position to a cutting position, each cutting head including a cutting blade and a pair of stripping blades with the stripping blades being located in spaced relation on either side of the cutting blade, first drive means for axially advancing an insulated wire between the cutting heads, a support member mounted for linear movement relative to each cutting head in said direction, a wire gathering member mounted on each support member and having a section extending laterally of said direction beyond the cutting and stripping blades, and second drive means for moving the cutting heads and said support member in said direction, said second drive means being constructed and arranged such that initial movement will move the wire gathering members to a wire gathering position on opposite sides of the wire and further movement of said second drive means will maintain said wire gathering members in the gathering position and move said cutting and stripping blades into cooperating relation to cut the wire and insulation.

2. The apparatus of claim 1, wherein the section of each wire gathering member is generally flat and parallel to the section of the other wire gathering member.

3. The apparatus of claim 2, wherein each wire gathering member is generally L-shaped.

4. The apparatus of claim 2, wherein the section of each wire gathering member has an axial length greater than the distance between the stripping blades, and said section has a plurality of spaced laterally extending slits each disposed to receive a corresponding cutting blade and stripping blade when the cutting head is moved to the cutting position.

5. The apparatus of claim 1, and including biasing means for biasing each wire gathering member in a direction toward each other.

6. The apparatus of claim 5, and including stop means inter-connecting the support member and the cutting head for limiting the movement of the wire gathering member under the force of said biasing means.

7. In a wire and stripping apparatus, a supporting structure, a pair of cutting heads mounted for linear movement on said supporting structure in a direction toward and away from each other from an open position to a cutting position, each cutting head including a cutting blade and a pair of stripping blades with said stripping blades being spaced on opposite sides of said cutting blade, first drive means for axially advancing an insulated wire between the cutting heads, a slide mounted for movement relative to each cutting head in said direction, biasing means interconnecting each slide with the respective cutting head for biasing the slides in a direction toward each other, a wire gathering member mounted on each slide and including a section extending laterally of said direction across the path of travel of the cutting and stripping blades, each section having an axial length greater than the distance between the stripping blades and said section having a plurality of laterally extending slits each disposed to receive a respective cutting blade and stripping blade when the cutting head is moved to the cutting position, and second drive means for moving the cutting heads in a direction toward each other with initial movement of said second drive means causing said wire gathering members to move to a wire gathering position on opposite sides of the wire and further movement of said second drive means causing said cutting blades and stripping blades to move through the respective slits to cut the wire and the insulation.

8. The apparatus of claim 7, wherein the wire gathering members are generally flat and disposed in parallel relation.

\* \* \* \* \*